(12) United States Patent        (10) Patent No.:     US 11,548,346 B2
Smith                             (45) Date of Patent:      Jan. 10, 2023

(54) SWAY BAR CLAMP

(71) Applicant: Justin Smith, Wittmann, AZ (US)

(72) Inventor: Justin Smith, Wittmann, AZ (US)

(73) Assignee: Shock Therapy Suspension, Inc., Duluth, GA (US)

( * ) Notice: Subject to any disclaimer, the term of this patent is extended or adjusted under 35 U.S.C. 154(b) by 0 days.

(21) Appl. No.: 17/388,877

(22) Filed: Jul. 29, 2021

(65) Prior Publication Data

US 2022/0032722 A1  Feb. 3, 2022

Related U.S. Application Data

(60) Provisional application No. 63/059,522, filed on Jul. 31, 2020.

(51) Int. Cl.
*B60G 21/055*   (2006.01)

(52) U.S. Cl.
CPC ................. *B60G 21/0553* (2013.01)

(58) Field of Classification Search
CPC ............ B60G 21/0553; B60G 21/0551; B60G 2202/135; B60G 2204/1224; B60G 2204/4307; B60G 2204/61; B60G 2206/427
See application file for complete search history.

(56) References Cited

U.S. PATENT DOCUMENTS

| 6,520,494 | B1 * | 2/2003 | Andersen | B60G 7/00 267/273 |
| 6,953,201 | B1 * | 10/2005 | VanDeMortel | B62K 21/14 280/279 |
| 2010/0072723 | A1 * | 3/2010 | Ciasulli | B60G 21/055 280/124.106 |

FOREIGN PATENT DOCUMENTS

| CN | 202411872 U | * | 9/2012 | |
| CN | 109203906 A | * | 1/2019 | ......... B60G 21/0553 |
| CN | 208498162 U | * | 2/2019 | ............. B60G 13/00 |
| CN | 209441140 U | * | 9/2019 | |
| WO | WO-2007126359 A1 | * | 11/2007 | ......... B60G 21/0551 |

OTHER PUBLICATIONS

Chen, An All-terrain Vehicle Adjustable Anti Roll Bar, Jan. 15, 2019, EPO, CN 109203906 A, Machine Translation of Description (Year: 2019).*

* cited by examiner

*Primary Examiner* — Paul N Dickson
*Assistant Examiner* — Matthew D Lee
(74) *Attorney, Agent, or Firm* — Schmeiser, Olsen & Watts LLP

(57) ABSTRACT

A clamp for securing a link to a bar or a rod in order to accommodate multiple connection points. The clamp or sway bar clamp includes multiple connection points for securing a link to a sway bar. The sway bar clamp goes over the end of the sway bar. It converts a sway bar with one connection point to a sway bar with multiple connection points to adjust flex of the sway bar.

19 Claims, 2 Drawing Sheets

SWAY BAR CLAMP

CROSS REFERENCE TO RELATED APPLICATION

This application claims priority to U.S. Provisional Patent Application to Justin Smith entitled "SWAY BAR CLAMP," Ser. No. 63/059,522, filed Jul. 31, 2020, the disclosure of which is hereby incorporated entirely herein by reference.

BACKGROUND OF THE INVENTION

Technical Field

This invention relates to a clamp, particularly a sway bar clamp.

State of the Art

Sway bars connect suspension components on either side of a car to minimize body leaning in turns. This shifting or flexing can cause changes in rate and preload. Sway bar end links or linkages are the attachment points between a sway bar and suspension members, keeping the suspension from exceeding its design parameters when the car is in motion and turning. Generally, sway bars have one connection point on each end for the link. The location of the connection point along the sway bar effects the overall flexing of the sway bar. The closer the link to the pivot point of the sway bar, the flex increases. Depending on where the point of contact of the link to the sway bar is, the overall flex of the sway bar can be adjusted.

Accordingly, what is needed is a clamp, such as a sway bar clamp with multiple connection points in order to provide the desired flex.

DISCLOSURE OF THE INVENTION

The disclosed invention relates to a clamp, such as a sway bar clamp. The clamp accommodates multiple connection points for securing a link to a bar or a rod.

Disclosed is a clamp for securing a link member to a rod, the clamp comprising: two clamp members, each of the two clamp members having a longitudinally extending inner recessed portion for receiving the rod; multiple apertures along a peripheral edge portion of each of the two clamp members; and at least one fastening means. The clamp may be configured for securing the link member to the rod in one of the multiple apertures. The clamp may be configured to partially surround an outer surface of the rod. The rod may be a sway bar for a vehicle. The at least one fastening means may comprise a bolt. The link member may be pivotable. The link member may comprise a sleeve. The link member may be coupled to an outer surface of one of the two clamp members. The link member may be provided between the two clamp members.

Disclosed is a sway bar clamp for securing a link member to a sway bar of a vehicle, the sway bar clamp comprising: two clamp members, each of the two clamp members having a longitudinally extending inner recessed portion for receiving the sway bar; multiple apertures along a peripheral edge portion of each of the two clamp members; and at least one fastening means. The sway bar clamp may be configured for securing the link member to the sway bar in one of the multiple apertures. The sway bar clamp may be configured to partially surround an outer surface of the sway bar. The at least one fastening means may comprise a bolt. The link member may be pivotable.

Disclosed is a combination sway bar and sway bar clamp for securing a link member to the sway bar, the sway bar clamp comprising: two clamp members, each of the two clamp members having a longitudinally extending inner recessed portion for receiving the sway bar; multiple apertures along a peripheral edge portion of each of the two clamp members; at least one link secured to the sway bar clamp through one of the multiple apertures; and at least one fastening means, wherein the two clamp members are coupled to the sway bar with the at least one fastening means. The sway bar clamp may be configured to partially surround an outer surface of the sway bar. The at least one fastening means may be a bolt.

The foregoing and other features and advantages of the invention will be apparent to those of ordinary skill in the art from the following more particular description of the invention and the accompanying drawings.

DETAILED DESCRIPTION OF EMBODIMENTS OF THE INVENTION

As discussed above, embodiments of the present invention relate to a clamp for adjustably securing a link to a rod or bar, such as a sway bar. The sway bar clamp converts a sway bar with one connection point to a sway bar with multiple connection points to adjust flex of the sway bar. Depending on where the link is secured to the connection points of the clamp determines overall flex of the sway bar. The closer the connection point to the pivot point of the sway bar, the overall flex is increased.

The sway bar clamps may be used on small passenger vehicles, or large heavy trucks. The sway bar clamp goes over the end of a sway bar that connects to a pivotable link. The sway bar clamp may be used on one or both ends of the sway bar. The sway bar clamp is simple and inexpensive to manufacture.

Figure 1:
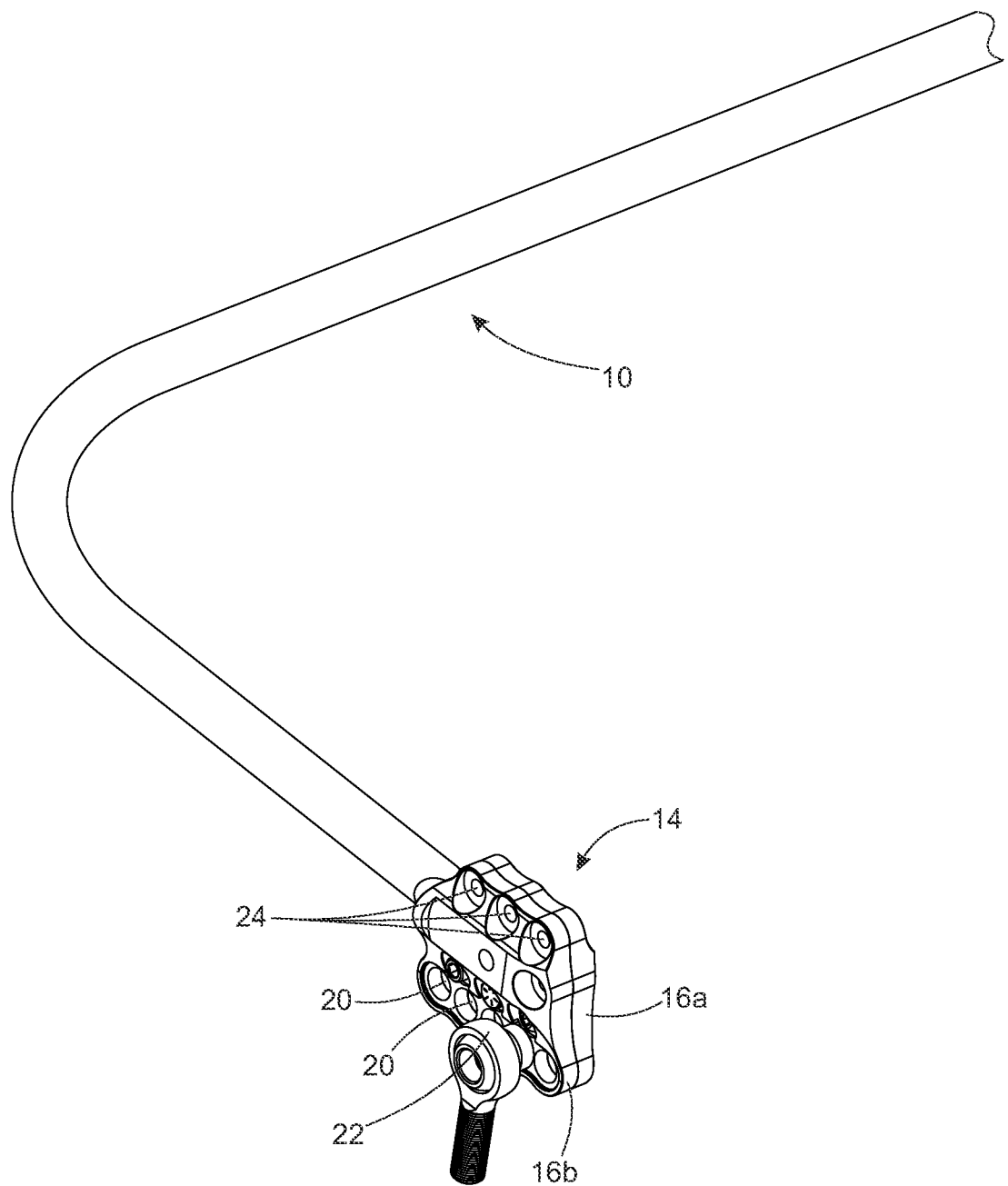
FIG. 1 shows a perspective assembled view of a sway bar clamp and sway bar according to the invention.
Figure 2:
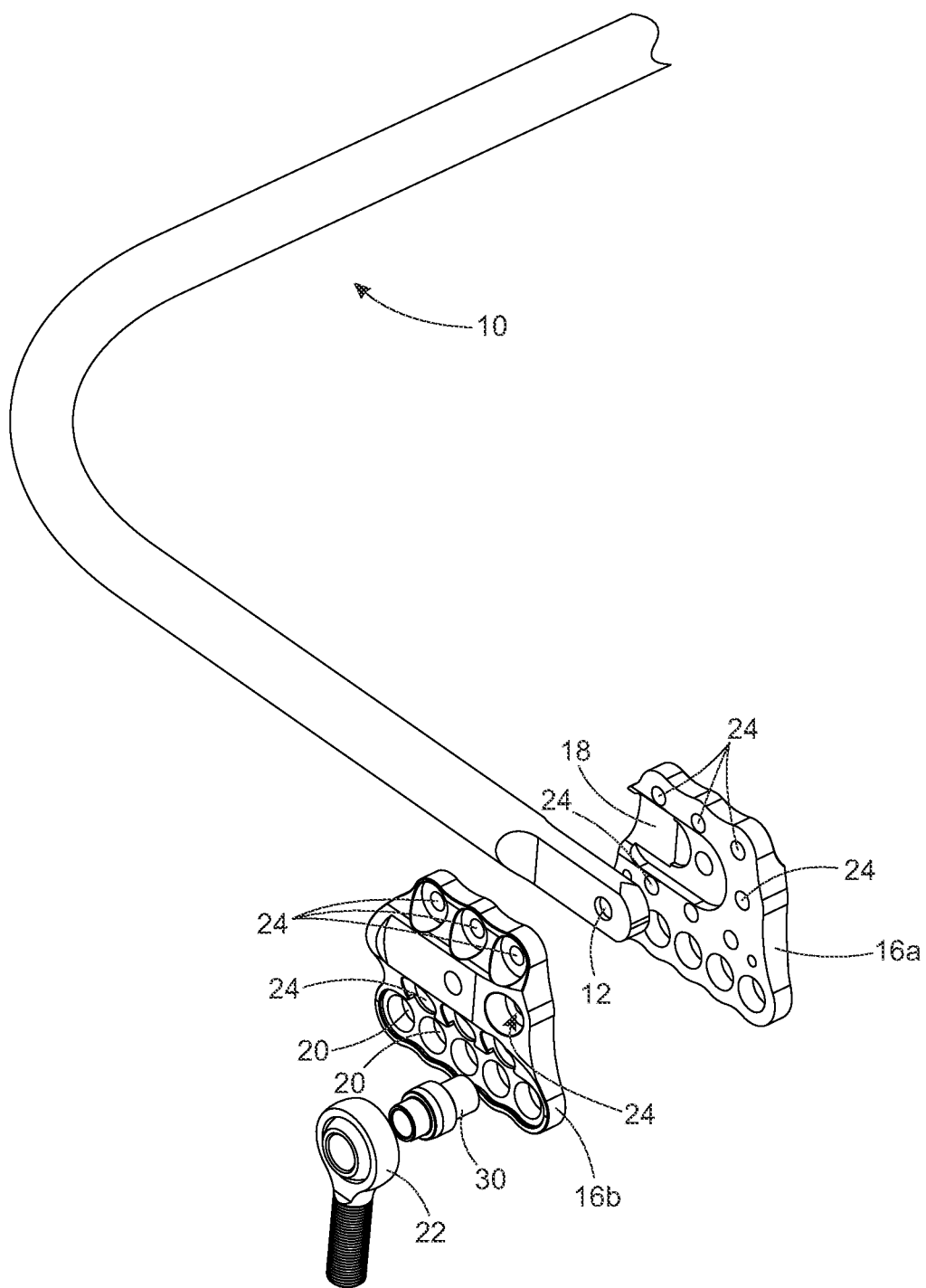
FIG. 2 shows an exploded perspective view of a sway bar clamp and sway bar according to the invention.

FIG. 1 shows sway bar 10 with sway bar connection points or apertures 12a and 12b at each end of sway bar 10. Sway bar clamp 14 comprises two clamp members 16a and 16b each having an inner recessed portion 18a and 18b for receiving sway bar 10. Sway bar clamp 14 comprises multiple clamp connection points or apertures 20 for securing a pivotable link 22 or the like. Link member 22 may have a transverse sleeve 30 for securing link 22 to assembled clamp members 16a and 16b. Link member 22 is coupled to an outer surface of one of the two clamp members 16a and 16b, such as coupled to the outer surface at or through one of the multiple clamp connection points or apertures 20. This allows for adjusting or tuning the flex of the sway bar 10 for the desired operation by the user. In another embodiment (not shown), link member 22 is sandwiched or provided between clamp members 16a and 16b.

Clamp members 16a and 16b comprise fastening points or apertures apertures 24 wherein a bolt or the like (not shown) couples clamp members 16a and 16b securely around sway bar 10. Clamp members 16a and 16b may also be coupled securely around sway bar 10 through sway bar connection points or apertures 12a and 12b with a bolt or the like (not shown).

Sway bar clamp 14 may be utilized to adjustably mount the sway bar 10 to any vehicle suspension system. The sway bar clamp 10 surrounds and fixedly engages sway bar 10, when sway bar clamp 14 and sway bar 10 are coupled by fastening means, such as by bolts, to an adjacent vehicle frame (not shown). Additionally, the sway bar clamp 14 may be utilized to convert the sway bar 10 that is already coupled to the vehicle suspension to an adjustable sway bar. In other words, embodiments of the sway bar clamp 14 may be coupled to an existing sway of a vehicle that has a single position for coupling to the link member 22 and convert it to an adjustable sway bar with more than one position for coupling the link member 22 to the sway bar 10.

While it is disclosed that that sway bar clamp 14 is formed of two clamp members, it will be understood that the sway bar clamp 14 may be a single body unit with a recess to receive the end of the sway bar and to be coupled to the sway bar to operate as disclosed above to adjust the flex of the sway bar.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

What is claimed is:

1. A clamp for securing a link member to a rod, the clamp comprising:
   two distinct and separate clamp members, each of the two clamp members having a longitudinally extending inner recessed portion for receiving the rod;
   multiple apertures along a peripheral edge portion of each of the two clamp members; and
   at least one fastening means, wherein the link member is coupled at an outer surface of one of the two clamp members.

2. The clamp of claim 1, wherein the clamp is configured for securing the link member to the rod in one of the multiple apertures.

3. The clamp of claim 1, wherein the clamp is configured to partially surround an outer surface of the rod.

4. The clamp of claim 1, wherein the rod is a sway bar for a vehicle.

5. The clamp of claim 1, wherein the at least one fastening means comprises a bolt.

6. The clamp of claim 1, wherein the link member is pivotable.

7. The clamp of claim 1, wherein the link member comprises a sleeve.

8. The clamp of claim 1, wherein the link member is provided between the two clamp members.

9. The clamp of claim 1, wherein the multiple apertures are on either side of the fastening means.

10. A sway bar clamp for securing a link member to a sway bar of a vehicle, the sway bar clamp comprising:
    two separate and distinct clamp members, each of the two clamp members having a longitudinally extending inner recessed portion for receiving the sway bar;
    multiple apertures along a peripheral edge portion of each of the two clamp members; and
    at least one fastening means, wherein the link member is coupled at an outer surface of one of the two clamp members.

11. The sway bar clamp of claim 10, wherein the sway bar clamp is configured for securing the link member to the sway bar in one of the multiple apertures.

12. The sway bar clamp of claim 10, wherein the sway bar clamp is configured to partially surround an outer surface of the sway bar.

13. The sway bar clamp of claim 10, wherein the at least one fastening means comprises a bolt.

14. The sway bar clamp of claim 10, wherein the link member is pivotable.

15. The sway bar clamp of claim 10, wherein the multiple apertures are on either side of the fastening means.

16. A combination sway bar and sway bar clamp for securing a link member to the sway bar, the sway bar clamp comprising:
    two separate and distinct clamp members, each of the two clamp members having a longitudinally extending inner recessed portion for receiving the sway bar;
    multiple apertures along a peripheral edge portion of each of the two clamp members;
    at least one link secured to the sway bar clamp through one of the multiple apertures; and
    at least one fastening means, wherein the two clamp members are coupled to the sway bar with the at least one fastening means, wherein the at least one link is coupled at an outer surface of one of the two clamp members.

17. The combination sway bar and sway bar clamp of claim 16, wherein the sway bar clamp is configured to partially surround an outer surface of the sway bar.

18. The combination sway bar and sway bar clamp of claim 16, wherein the at least one fastening means is a bolt.

19. The combination sway bar and clamp of claim 16, wherein the multiple apertures are on either side of the fastening means.

* * * * *